(12) United States Patent
He et al.

(10) Patent No.: US 8,869,712 B2
(45) Date of Patent: Oct. 28, 2014

(54) PRECISION TILTING PLATFORM DEVICE USED FOR STATIC CALIBRATION OF SEISMOMETERS

(75) Inventors: Wen He, Hangzhou (CN); Guanhua Xu, Hangzhou (CN); Shushi Jia, Hangzhou (CN)

(73) Assignee: Zhejiang University, Hangzhou, Zhejiang Province (CN)

( * ) Notice: Subject to any disclaimer, the term of this patent is extended or adjusted under 35 U.S.C. 154(b) by 0 days.

(21) Appl. No.: 14/112,442

(22) PCT Filed: May 3, 2012

(86) PCT No.: PCT/CN2012/075027
§ 371 (c)(1),
(2), (4) Date: Oct. 17, 2013

(87) PCT Pub. No.: WO2013/044632
PCT Pub. Date: Apr. 4, 2013

(65) Prior Publication Data
US 2014/0033955 A1    Feb. 6, 2014

(30) Foreign Application Priority Data
Sep. 30, 2011    (CN) .......................... 2011 1 0298423

(51) Int. Cl.
*A47F 5/12* (2006.01)
*G01V 13/00* (2006.01)
*A47B 37/00* (2006.01)

(52) U.S. Cl.
CPC ............... *G01V 13/00* (2013.01); *A47B 37/00* (2013.01)
USPC ............................................. 108/7; 108/20

(58) Field of Classification Search
USPC ................ 108/7, 20, 21, 22; 74/16; 248/371, 248/349.1
See application file for complete search history.

(56) References Cited

U.S. PATENT DOCUMENTS

| | | | |
|---|---|---|---|
| 5,144,598 A | | 9/1992 | Engdahl |
| 5,613,403 A | * | 3/1997 | Takei .......................... 74/490.09 |
| 5,685,232 A | * | 11/1997 | Inoue ............................... 108/20 |
| 5,761,960 A | * | 6/1998 | Nagai et al. ................... 74/89.33 |
| 6,550,401 B2 | * | 4/2003 | Chiba ............................... 108/7 |

(Continued)

FOREIGN PATENT DOCUMENTS

| | | |
|---|---|---|
| CN | 201192679 Y | 2/2009 |
| CN | 101806617 A | 8/2010 |
| CN | 201666816 U | 12/2010 |
| CN | 101936797 A | 1/2011 |

(Continued)

*Primary Examiner* — Jose V Chen
(74) *Attorney, Agent, or Firm* — Jacobson Holman Hershkovitz PLLC; Jiwen Chen

(57) ABSTRACT

A precision tilting platform used for static calibration of seismometers includes a base, a worktable, a rotary part, a driving part, a measuring part and supporting frames. The rotary part includes a shaft, a driving arm, a rotary table and a clump weight. The driving part includes a linear motor, a sliding table, a pair of linear guides and sliders and a grating scale. The readhead of the grating scale is fixed with the base and sends out a signal of zero position when the worktable is horizontal. The sliding table contacts the driving arm. When the linear motor is moving forward, the rotary part rotates toward the positive direction. When the linear motor is moving backward, the rotary part rotates toward the negative direction under gravity of the clump weight. The measuring part includes a laser interferometer and a reflector to obtain the tilting angle of the worktable.

10 Claims, 4 Drawing Sheets

(56) References Cited

U.S. PATENT DOCUMENTS

| | | | |
|---|---|---|---|
| 2003/0136309 A1* | 7/2003 | Shinozaki et al. | 108/20 |
| 2005/0229818 A1* | 10/2005 | Omori | 108/20 |
| 2008/0196631 A1* | 8/2008 | Kosmowski et al. | 108/20 |
| 2011/0219990 A1* | 9/2011 | Saito | 108/20 |
| 2013/0098274 A1* | 4/2013 | Kobayashi | 108/20 |

FOREIGN PATENT DOCUMENTS

| | | |
|---|---|---|
| CN | 101968380 A | 2/2011 |
| CN | 202275167 U | 6/2012 |
| JP | 10-2914 A | 1/1998 |
| JP | 2000-136978 A | 5/2000 |

* cited by examiner

# PRECISION TILTING PLATFORM DEVICE USED FOR STATIC CALIBRATION OF SEISMOMETERS This is a U.S. national stage application of PCT Application No. PCT/CN2012/075027 under 35 U.S.C. 371, filed May 3, 2012 in Chinese, claiming the priority benefit of Chinese Application No. 201110298423.2, filed Sep. 30, 2011, which is hereby incorporated by reference.

FIELD OF THE INVENTION

The present invention relates to a precision tilting platform used for static calibration of seismometers.

BACKGROUND OF THE INVENTION

The passband of accelerometers used in the strong earthquake motion networks usually starts from zero. Its sensitivity can be considered the same and the linearity characteristic is consistent among the various frequencies points during the whole passband. Consequently, characteristics of the seismometers in the passband (especially in the low frequency passband) can be acquired according to testing and calibrating the sensitivity and linearity precisely under zero frequency (or 'static state').

At present, the electrically powered tilting platform made for optical calibration is a kind of precision tilting platform typically used, in which stepper motors and worm drives are utilized. As the existence of transmission clearances owing to worm drives, the positioning precision is limited. Furthermore, the transmission efficiency is low because of the friction loss of the worm drives. Though semi-closed loop control is realized when the optional encoder is mounted, full-closed loop control is not realized. Consequently, the positioning accuracy is affected. Moreover, the tilting angle is figured out by the displacement of the stepper motor and no precision device is used for measuring the tilting angle directly. Thus, measuring error occurred.

SUMMARY OF THE INVENTION

In order to solve the problem of low positioning accuracy, low transmission efficiency and limited application of the present tilting platform, the present invention provides a precision tilting platform used for static calibration of seismometers with a high positioning accuracy, high transmission efficiency and wide application.

A precision tilting platform used for static calibration of seismometers is setup based on a base, on which the following parts are assembled: a worktable, a rotary part that connected to the worktable and rotates together with the worktable, a driving part that drives the worktable and rotary part, a measuring part that measures the tilting angle, a left supporting frame and a right supporting frame that support the worktable and rotary part.

The rotary part is composed of a shaft that makes the worktable rotate with it, a driving arm and a rotary table that fixed with the worktable, a clump weight that mounted on one end of the rotary table. The shaft is fixed on the left and right supporting frames.

The driving part and clump weight are assembled beside the two sides of the driving arm. The driving part includes a linear motor, a sliding table that connected to the rotor of the linear motor, a pair of linear guides and sliders that make the sliding table move along the linear guides, a grating scale that fixed on the sliding table to measure the linear displacement of the linear motor. The readhead of the grating scale is fixed with the base and sends out the signal of zero position when the worktable is horizontal.

The sliding table is closely contacted to the driving arm. When the linear motor is moving forward, the rotary part is pushed by the sliding table and rotates toward the positive direction. When the linear motor is moving backward, the sliding table is pulled backward and the rotary part rotates toward the negative direction because of the gravity of the clump weight.

The measuring part is composed of a laser interferometer and a reflector that reflects the laser beam back to the laser interferometer to obtain the tilting angle of the worktable, on which the reflector is mounted.

Moreover, the worktable and rotary table is fixed together. The rotary table is connected to the driving arm by screws. The shaft which passes through the rotary table is fixed on the left and right supporting frames by a mounting bracket. Rolling bearings are assembled between the shaft and the rotary table.

Moreover, the mounting bracket is composed of a pair of lower half that fixed on the left and right supporting frames and a pair of upper half which press the shaft to the lower half in order to make the shaft restrained.

Moreover, an antifriction part is mounted between the sliding table and driving arm. The antifriction part is composed of a steel ball that fixed on the sliding table and an antifriction plate that fixed on the driving arm. The antifriction plate bears the force between the sliding table and rotary part and reduces the friction between the steel ball and itself. The contact facet on the antifriction plate, which contacts to the steel ball is perpendicular to the upper facet of the worktable. A ball seat is fixed on the sliding table, in which the steel ball is settled by fastening a round nut. The steel ball is closely contacted to the antifriction plate.

Moreover, the ball seat includes an annular seat that connected to the sliding table by bolts and a boss that holds the steel ball. A cone shaped deboss is formed in the boss, in which the steel ball is held and closely line contacted to the cone shaped deboss. An external thread is provided on the outside surface of the boss. The boss and round nut are connected by the external thread. An annular ring is provided on one end of the round nut in order to prevent the steel ball from separating from the ball seat.

Moreover, the tilting platform includes a spring balancing part that used for balancing the force to the sliding table caused by the clump weight. The spring balancing part is composed of a pair of hanging nails that fixed on the sliding table, a spring bracket that fixed on the base, a pair of pulling nails that pass through the spring bracket, a pair of screw nuts that screwed on the pulling nails and a pair of springs assembled between the hanging nails and pulling nails. The springs exert a horizontal pulling force on the sliding table toward the clump weight.

Moreover, the left and right supporting frames lie symmetrically beside the worktable. A mounting box for the laser interferometer is assembled between the left and right supporting frames. The laser interferometer is located below the worktable. A circular hole in the center of the top of the mounting box makes the laser pass through the mounting box. The reflector aims at the circular hole.

Alternatively, the laser interferometer is mounted on a bracket for the interferometer which put on the ground. The interferometer is located beside one side of the worktable and the reflector is assembled on the worktable.

Moreover, a pair of positive limiting screws and negative limiting screws which stop the rotary table at the positive and negative limiting position are mounted beside the two sides of the rotary table, respectively. Each pair of the limiting screws is composed of two limiting screws assembled on the left and right supporting frames symmetrically. A proximity switch is mounted beside each limiting screw.

Moreover, the driving part also includes a baseboard, a primary mounting support and a secondary mounting support. The baseboard is fixed on the base by bolts and the linear guides are fixed on the baseboard. The sliders connected to the linear guides can slide along the linear guides. The sliding table is fixed on the sliders simultaneously.

The stator of the linear motor is connected to the baseboard by its two ends, which are fixed on the primary and secondary mounting supports.

The readhead of the grating scale is connected to the baseboard by a bracket for the readhead.

Moreover, a first temperature sensor is mounted on the lower surface of the worktable. A second temperature sensor and an atmospheric pressure sensor are mounted above the mounting box for the interferometer.

The technical idea for this invention is as follows: the rotary table and driving arm are fixed. The worktable is mounted on the top surface of the rotary table. Thus the driving arm and worktable are fixed. The driving arm forms the arm of the force vertical to the top surface of the worktable. The linear motor is assembled horizontally and the movement of which make the driving arm, rotary table and worktable rotate about the shaft. Therefore, the displacement of the linear motor is converted to the angular displacement of the worktable. Consequently, the static tilting angle of the worktable is realized.

In order to decrease the clearance of the transmission, the clump weight is mounted on one end of the rotary table. The clump weight increases the loads of the linear motor and the spring balancing part decreases that. As the clump weight is mounted on one end of the rotary table and its gravity causes a torque effect on the center of the rotary table, which makes the steel ball and antifriction plate closely contacted. When the linear motor is moving forward, the rotary part and the worktable is pushed and rotates toward the positive direction. When the linear motor is moving backward, the rotary part and the worktable rotates toward the negative direction because of the gravity of the clump weight.

A computer figures out the displacement of the linear motor/(relative to the zero position) according to the tilting angle of the worktable θ. The computational equation is:

$$l = R \cdot \tan\theta - r \cdot \left(\frac{1}{\cos\theta} - 1\right) \quad (-5° \leq \theta \leq 5°)$$

where R is the vertical distance between the center of the steel ball and the axis of the shaft when the worktable is at the horizontal position, and r is the radius of the steel ball.

The computer sends the displacement of the linear motor by computer BUS to a controller of the linear motor, which forms the closed loop control system together with the linear motor and the grating scale. The controller drives the linear motor, and the displacement of the linear motor is measured by the grating scale and sent to the controller, and the controller realizes the positioning control by the PID algorithm.

The laser interferometer is adopted to measure the tilting angle precisely. The measured tilting angle is transferred to the computer by the computer BUS. The computer realizes the adjustment of the positioning control. Combined with the closed loop control system of the controller of the linear motor, a precise full-closed loop control system is constructed.

As temperature or pressure change may affects the measuring accuracy, the temperature sensors and pressure sensor are adopted to measure the air temperature, the temperature of the worktable and the air pressure, which are sent to the computer by a data acquisition card. The computer realizes compensation according to the temperature of the air and worktable, the air pressure and the measured result of the interferometer. Thus the tilting angle is measured very precisely.

The linear motor is used in this invention. The thrust force to the linear motor is even and the operation parallelism is well. The clump weight and spring balancing part decrease both the transmission clearance and the load of the linear motor. The invention has the advantage of high positioning accuracy, high transmission efficiency and high reliability. The laser interferometer is used to measure the tilting angle, thus the measuring accuracy is very high. Besides, the tilting platform is automatically controlled by the computer. The invention can be applied in the static calibration of the seismometers.

DETAILED DESCRIPTION OF THE INVENTION

Figure 1:
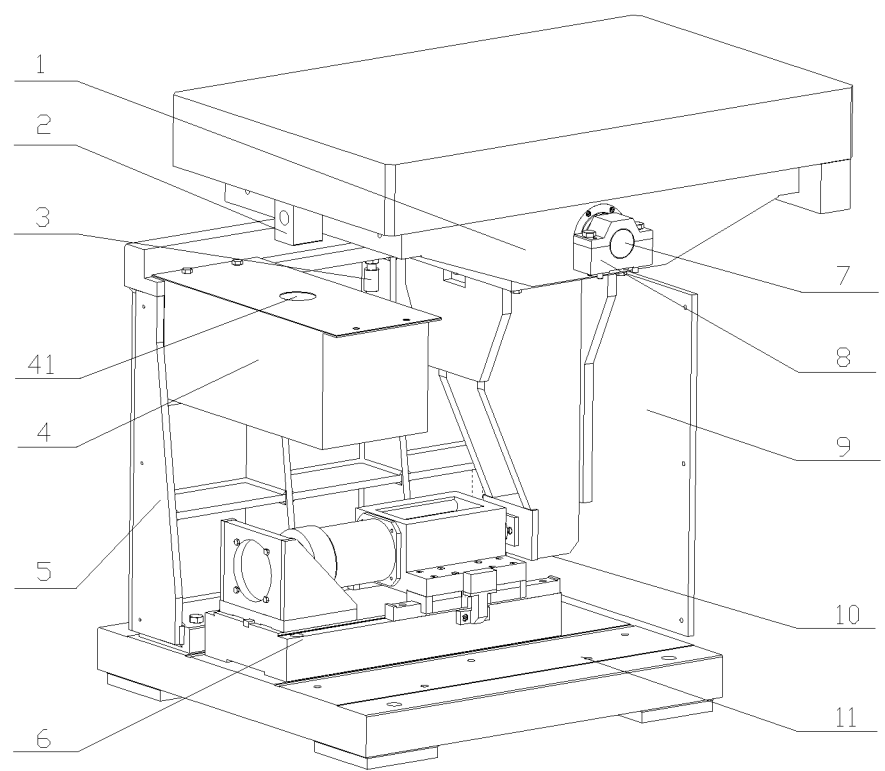
FIG. 1 is a whole structure view of the embodiment 1.

Hereinafter, embodiments of the present invention will be described with reference to the accompanying drawings.

Embodiment 1

FIGS. 1, 3, 4, 6, 7 as reference.

A precision tilting platform used for static calibration of seismometers is provided based on a base 11, on which the following parts are assembled: a worktable 12, a rotary part 1 that connected to the worktable 12 and rotates together with the worktable 12, a driving part 6 that drives the worktable 12 and rotary part 1, a measuring part that measures the tilting angle, a left supporting frame 5 and a right supporting frame that support the worktable 12 and rotary part 1.

The rotary part 1 is composed of a shaft 7 that makes the worktable 12 rotate with it, a driving arm 13 and a rotary table 16 that fixed with the worktable 12, a clump weight 15 that mounted on one end of the rotary table 16. The shaft 7 is fixed on the left and right supporting frames.

The driving part 6 and clump weight 15 are assembled beside the two sides of the driving arm 13. The driving part 6 includes a linear motor, a sliding table 19 that connected to the rotor 18 of the linear motor, a pair of linear guides 26 and sliders 30 that make the sliding table 19 move along the linear guides 26, a grating scale 27 that fixed on the sliding table 19 to measure the linear displacement of the linear motor. The readhead 29 of the grating scale 27 is fixed with the base 11 and sends out the signal of zero position when the worktable 12 is horizontal.

The sliding table 19 is closely contacted to the driving arm 13. When the linear motor is moving forward, the rotary part is pushed by the sliding table and rotates toward the positive direction. When the linear motor is moving backward, the sliding table is pulled backward and the rotary part rotates toward the negative direction because of the gravity of the clump weight.

The measuring part is composed of a laser interferometer and a reflector 2 that reflects the laser beam back to the laser interferometer to obtain the tilting angle of the worktable 12, on which the reflector 2 is mounted.

The worktable 12 and rotary table 16 is fixed together. The rotary table 16 is connected to the driving arm 13 by screws. The shaft 7 which passes through the rotary table 16 is fixed on the left and right supporting frames by a mounting bracket 8. Rolling bearings are assembled between the shaft 7 and rotary table 16.

The mounting bracket 8 is composed of a pair of lower half that fixed on the left and right supporting frames and a pair of upper half which press the shaft 7 to the lower half. The shaft 7 is restrained by static friction of the mounting bracket 8.

An antifriction part is mounted between the sliding table 19 and driving arm 13. The antifriction part is composed of a steel ball 23 that fixed on the sliding table 17 and an antifriction plate 14 that fixed on the driving arm 13. The antifriction plate 14 bears the force between the sliding table 19 and rotary part 1 and reduces the friction between the steel ball 23 and itself. The contact facet on the antifriction plate 14, which contacts to the steel ball 23 is perpendicular to the upper facet of the worktable 12. A ball seat 21 is fixed on the sliding table 19, in which the steel ball 23 is settled by fasten a round nut 22. The steel ball 23 is closely contacted to the antifriction plate 14.

The ball seat 21 includes an annular seat 211 that connected to the sliding table 19 by bolts and a boss 212 that holds the steel ball 23. A cone shaped deboss 213 is formed in the boss 212, in which the steel ball 23 is held and closely line contacted to the cone shaped deboss 213. An external thread is provided on the outside surface of the boss 212. The boss 212 and round nut 22 is connected by the external thread. An annular ring 221 is provided on one end of the round nut 22 in order to prevent the steel ball 23 from separating from the call seat.

The left and right supporting frames lie symmetrically beside the worktable 12. A mounting box 4 for the laser interferometer is assembled between the left and right supporting frames. The laser interferometer is located below the worktable 12. A circular hole 41 in the center of the top of the mounting box 4 makes the laser pass through the mounting box 4. The reflector 2 aims at the circular hole 41.

A pair of positive limiting screws and negative limiting screws which stop the rotary table 16 at the positive and negative limiting position are mounted beside the two sides of the rotary table 16, respectively. Each pair of the limiting screws is composed of two limiting screws 3 assembled on the left and right supporting frames symmetrically. A proximity switch is mounted beside each limiting screw 3.

The driving part 6 also includes a baseboard 25, a primary mounting support 24 and a secondary mounting support 20. The baseboard 25 is fixed on the base 11 by bolts and the linear guides 26 are fixed on the baseboard 25. The sliders 30 connected to the linear guides 26 can slide along the linear guides 26. The sliding table 19 is fixed on the sliders 30 simultaneously.

The stator 17 of the linear motor is connected to the baseboard 25 by its two ends, which are fixed on the primary and secondary mounting supports 24 and 20.

The readhead 29 of the grating scale 27 is connected to the baseboard 25 by a bracket 28 for the readhead.

The worktable 12 is made of granite, marble or steel. A first temperature sensor is mounted on the lower surface of the worktable 12. A second temperature sensor and an atmospheric pressure sensor are mounted above the mounting box 4 for the interferometer.

The technical idea for the present embodiment is as follows: the rotary table and driving arm are fixed. The worktable is mounted on the top surface of the rotary table. Thus the driving arm and worktable are fixed. The driving arm forms the arm of the force vertical to the top surface of the worktable. The linear motor is assembled horizontally and the movement of which make the driving arm, rotary table and worktable rotate about the shaft. Therefore, the displacement of the linear motor is converted to the angular displacement of the worktable. Consequently, the static tilting angle of the worktable is realized.

As the clump weight is mounted on one end of the rotary table and its gravity causes a torque effect on the center of the rotary table, which makes the steel ball and antifriction plate closely contacted. When the linear motor is moving forward, the rotary part and the worktable is pushed and rotates toward the positive direction. When the linear motor is moving backward, the rotary part and the worktable rotates toward the negative direction because of the gravity of the clump weight.

A computer figures out the displacement of the linear motor/(relative to the zero position) according to the tilting angle of the worktable θ. The computational equation is:

$$l = R \cdot \tan\theta - r \cdot \left(\frac{1}{\cos\theta} - 1\right) \quad (-5° \leq \theta \leq 5°)$$

where R is the vertical distance between the center of the steel ball and the axis of the shaft when the worktable is at the horizontal position, and r is the radius of the steel ball.

The computer sends the displacement of the linear motor by computer BUS to a controller of the linear motor, which forms the closed loop control system together with the linear motor and the grating scale. The controller drives the linear motor, and the displacement of the linear motor is measured by the grating scale and sent to the controller, and the controller realizes the positioning control by the PID algorithm.

The laser interferometer is adopted to measure the tilting angle precisely. The measured tilting angle is transferred to the computer by the computer BUS. The computer realizes the adjustment of the positioning control. Combined with the closed loop control system of the controller of the linear motor, a precise full-closed loop control system is constructed.

As temperature or pressure change may affects the measuring accuracy, the temperature sensors and pressure sensor are adopted to measure the air temperature, the temperature of the worktable and the air pressure, which are sent to the computer by a data acquisition card. The computer realizes compensation according to the temperature of the air and worktable, the air pressure and the measured result of the interferometer. Thus the tilting angle is measured very precisely.

The linear motor is used in this invention. The thrust force to the linear motor is even and the operation parallelism is well. The clump weight and spring balancing part decrease both the transmission clearance and the load of the linear motor. The invention has the advantage of high positioning accuracy, high transmission efficiency and high reliability. The laser interferometer is used to measure the tilting angle, thus the measuring accuracy is very high. Besides, the tilting platform is automatic controlled by the computer. The invention can be applied in the static calibration of the seismometers.

Embodiment 2

Figure 2:
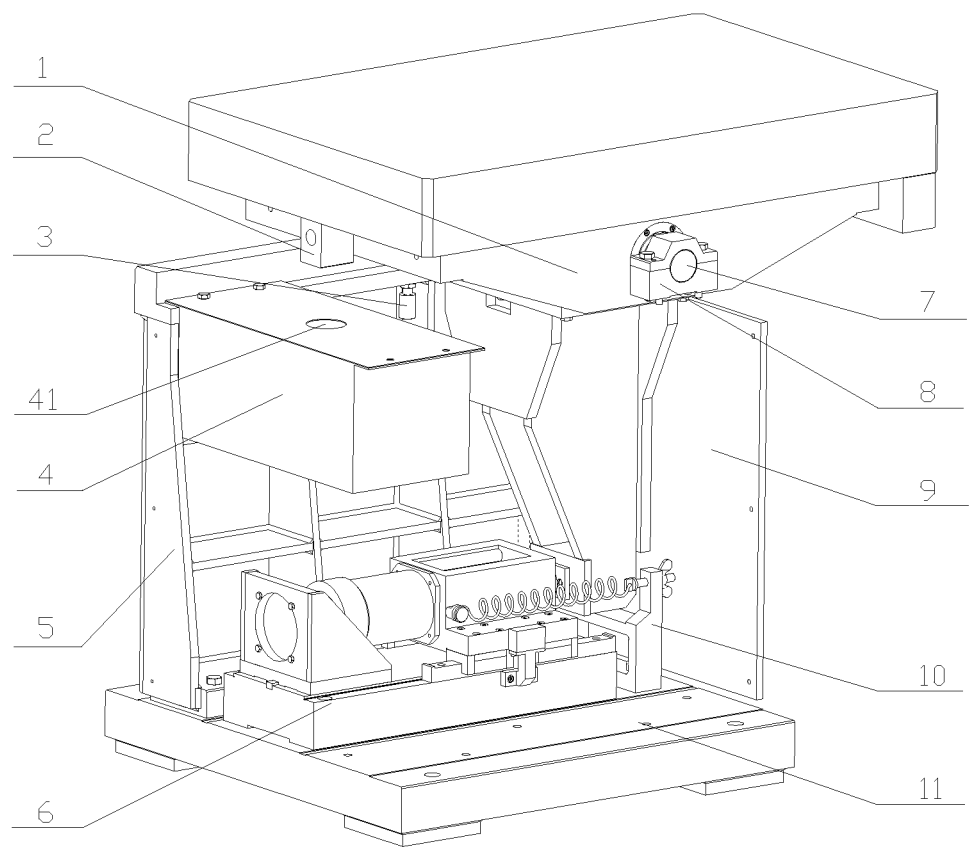
FIG. 2 is a whole structure view of the embodiment 2.
Figure 3:
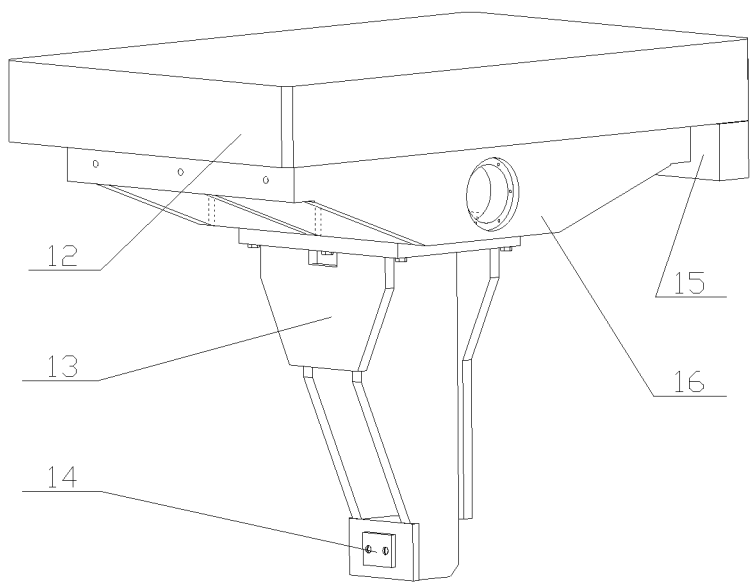
FIG. 3 is a view of the rotary part without the shaft combined with the worktable.
Figure 4:
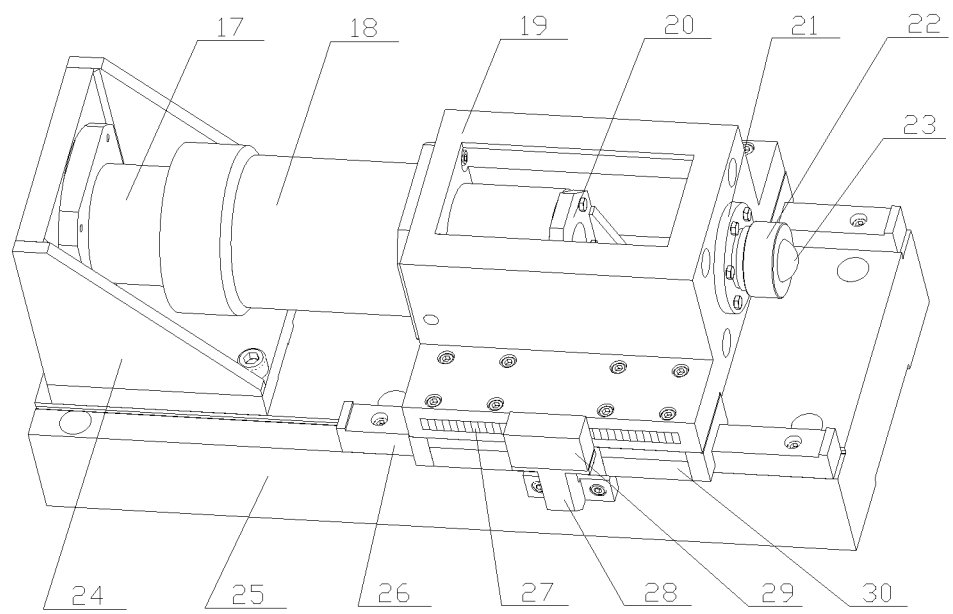
FIG. 4 is a structure view of the driving part.
Figure 5:
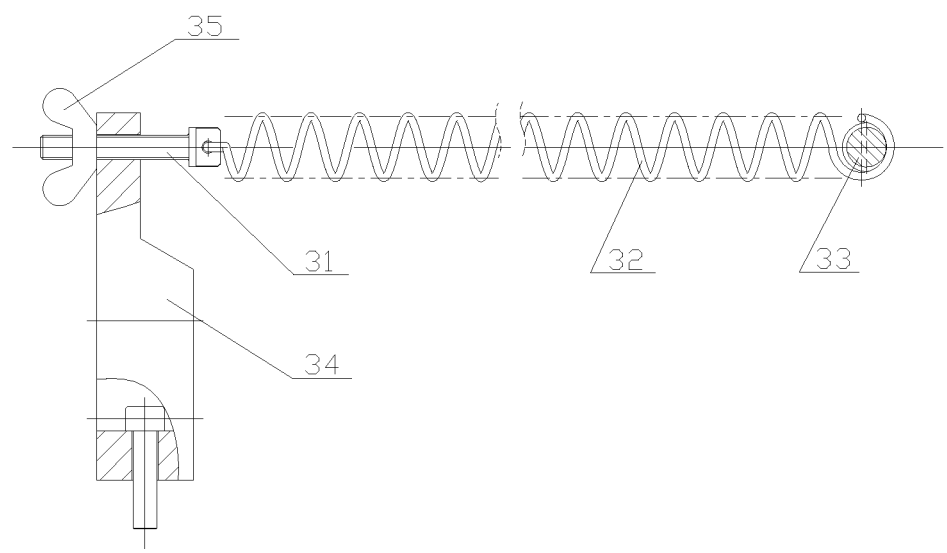
FIG. 5 is a structure view of the spring balancing part.
Figure 6:
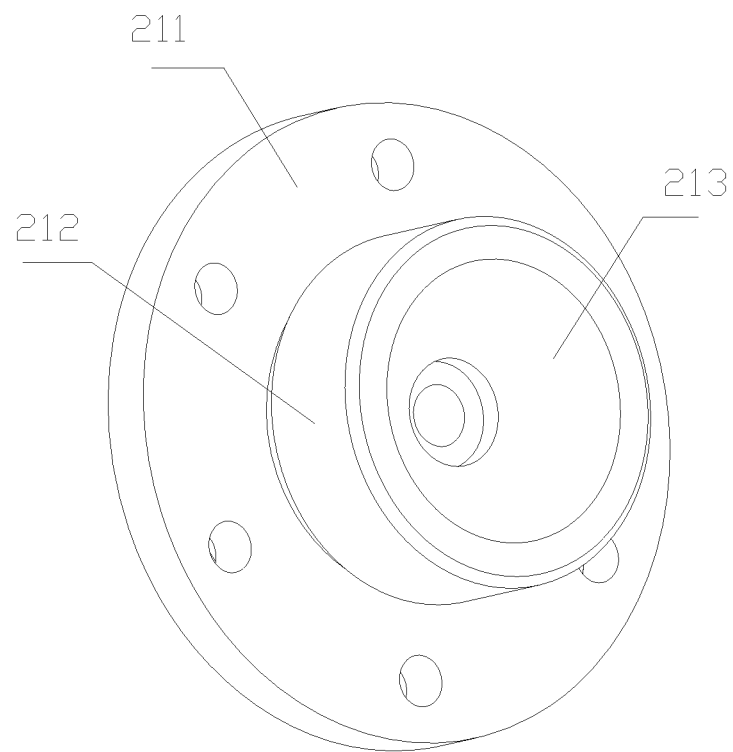
FIG. 6 is a view of the ball seat.
Figure 7:
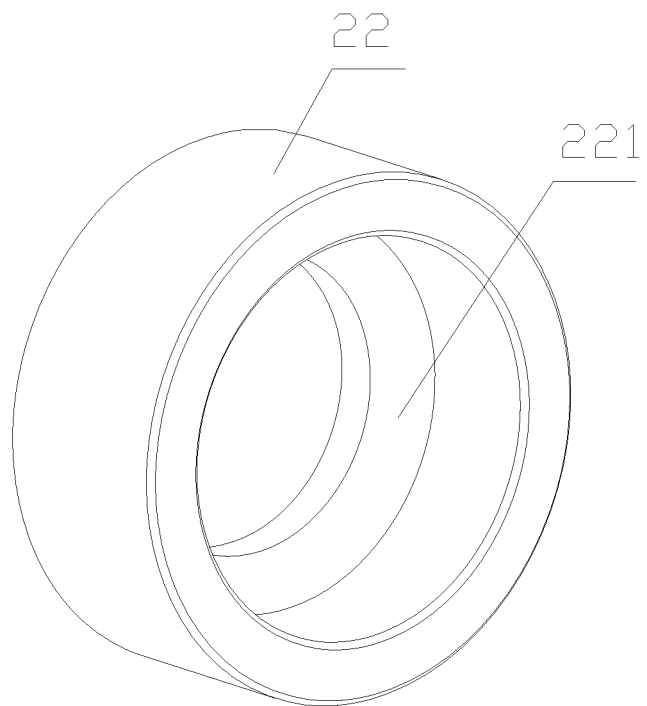
FIG. 7 is a view of the round nut.

FIGS. 2 and 5 as references.

The differences between this embodiment and embodiment 1 are as follows: the tilting platform also includes a spring balancing part that used for balancing the force to the sliding table 19 caused by the clump weight 15. The spring balancing part is composed of a pair of hanging nails 33 that fixed on the sliding table 19, a spring bracket 34 that fixed on the base 11, a pair of pulling nails 31 that pass through the spring bracket 34, a pair of screw nuts 35 that screwed on the pulling nails 31 and a pair of springs 32 assembled between the hanging nails 33 and pulling nails 31. The springs 32 exert a horizontal pulling force on the sliding table 19 toward the clump weight 15.

The screw nuts 35 are wing nuts. The remainder structures are the same.

The technical idea for the present embodiment is as follows:

In order to decrease the load of the linear motor, the spring balancing part is designed. The clump weight increases the loads of the linear motor and the spring balancing part decrease that.

When the linear motor is moving forward, the springs realize a positive pulling force to the sliding table and the resistance of the clump weight is balanced. Therefore, little driving force of the linear motor is needed to make the sliding table move.

When the linear motor is moving backward, the pulling forces of the springs turn to resistance. However, the direction of pressing force of the clump weight to the sliding table is same to the moving direction. Thus, the resistance of the springs is balanced. Similarly, little driving force of the linear motor is needed to make the sliding table move.

Embodiment 3

The differences between this embodiment and embodiment 1 are as follows: the laser interferometer is mounted on a bracket for the interferometer which put on the ground. The interferometer is located beside one side of the worktable 12 and the reflector 2 is assembled on the worktable 12.

The bracket for the interferometer is a tripod.

The technical idea for the present embodiment is as follows: the laser interferometer can be moved conveniently when the bracket for the interferometer is used. If multiple reflectors are mounted on the worktable, tilting angle of different spot on the worktable can be measured conveniently. Thus the application is easy and convenient.

The specific embodiments discussed are merely illustrative of specific ways to make and use the invention, and do not limit the scope of the invention. Meanwhile, it should be appreciated that various modifications and their equivalents can be devised by those skilled in the art and will fall within the spirit and scope of the principles of the disclosure.

The invention claimed is:

1. A precision tilting platform used for static calibration of seismometers characterized in that it comprises:
a base, on which the following parts are provided: a worktable, a rotary part that connected to the worktable and rotates together with the worktable, a driving part that is operatively connected with and drives the worktable and rotary part to rotate through a linear motor, a measuring part that measures a tilting angle of the worktable, a left supporting frame and a right supporting frame that support the worktable and rotary part;

wherein the rotary part is composed of a shaft around which the rotary part and the worktable rotate, a driving arm and a rotary table that fixed with the worktable, a clump weight that mounted on one end of the rotary table, the shaft is fixed on the left and right supporting frames;

wherein the driving part and clump weight are assembled beside two opposite sides of the driving arm, the driving part includes the linear motor, a sliding table that connected to a rotor of the linear motor, a pair of linear guides and sliders that make the sliding table move along the linear guides, a grating scale that fixed on the sliding table to measure linear displacement of the linear motor, a readhead of the grating scale is fixed with the base and sends out a signal of zero position when the worktable is horizontal;

where the sliding table contacts the driving arm, when the linear motor is moving forward, the rotary part is pushed by the sliding table and rotates toward a positive direction, when the linear motor is moving backward, the sliding table is pulled backward and the rotary part rotates toward a negative direction because of gravity of the clump weight mounted on the rotary table;

wherein the measuring part is composed of a laser interferometer and a reflector that is spaced apart from the laser interferometer and reflects a laser beam emitted from the laser interferometer back to the laser interferometer to obtain the tilting angle of the worktable on which the reflector is mounted.

2. The precision tilting platform used for static calibration of seismometers according to claim 1, wherein the worktable and rotary table is fixed together, the rotary table is connected to the driving arm by screws, the shaft which passes through the rotary table is fixed on the left and right supporting frames by a mounting bracket, rolling bearings are assembled between the shaft and rotary table.

3. The precision tilting platform used for static calibration of seismometers according to claim 2, wherein the mounting bracket is composed of a pair of lower half brackets that are fixed on the left and right supporting frames, respectively, and a pair of upper half brackets which press the shaft to the lower half brackets in order to make the shaft restrained between the upper half brackets and the lower half brackets.

4. The precision tilting platform used for static calibration of seismometers according to claim 3, wherein a pair of positive limiting screws and negative limiting screws which stop the rotary table at the positive and negative limiting position are mounted beside the two sides of the rotary table respectively, each pair of the limiting screws is composed of two limiting screws assembled on the left and right supporting frames symmetrically, a proximity switch is mounted beside each limiting screw.

5. The precision tilting platform used for static calibration of seismometers according to claim 4, wherein the driving part also includes a baseboard, a primary mounting support and a secondary mounting support, the baseboard is fixed on the base by bolts and the linear guides are fixed on the baseboard, the sliders connected to the linear guides can slide along the linear guides, the sliding table is fixed on the sliders simultaneously; wherein the stator of the linear motor is connected to the baseboard by its two ends, which are fixed on the primary and secondary mounting supports; wherein the readhead of the grating scale is connected to the baseboard by a bracket for the readhead.

6. The precision tilting platform used for static calibration of seismometers according to claim 1, wherein an antifriction part is mounted between the sliding table and driving arm; the antifriction part is composed of a steel ball that fixed on the sliding table and an antifriction plate that fixed on the driving arm; the antifriction plate bears a force between the sliding table and rotary part and reduces friction between the steel ball and itself; a contact facet on the antifriction plate, which contacts to the steel ball is perpendicular to an upper facet of the worktable; a ball seat is fixed on the sliding table, in which the steel ball is settled by fastening a round nut; the steel ball contacts the antifriction plate.

7. The precision tilting platform used for static calibration of seismometers according to claim 6, wherein the ball seat includes an annular seat that connected to the sliding table by bolts and a boss that holds the steel ball; a cone shaped deboss is formed in the boss, in which the steel ball is held and contacts the cone shaped deboss; an external thread is provided on an outside surface of the boss; the boss and round nut is connected by an external thread; an annular ring is provided on one end of the round nut in order to prevent the steel ball from separating from the ball seat.

8. The precision tilting platform used for static calibration of seismometers according to claim 7, wherein the precision tilting platform includes a spring balancing part that used for balancing a force to the sliding table caused by the clump weight; the spring balancing part is composed of a pair of hanging nails that fixed on the sliding table, a spring bracket that fixed on the base, a pair of pulling nails that pass through the spring bracket, a pair of screw nuts that screwed on the pulling nails and a pair of springs assembled between the hanging nails and pulling nails; the springs exert a horizontal pulling force on the sliding table toward the clump weight.

9. The precision tilting platform used for static calibration of seismometers according to claim 8, wherein the left and right supporting frames lie symmetrically beside the worktable; a mounting box for the laser interferometer is assembled between the left and right supporting frames; the laser interferometer is located below the worktable; a circular hole in a center of a top of the mounting box makes the laser pass through the mounting box; the reflector aims at the circular hole.

10. The precision tilting platform used for static calibration of seismometers according to claim 8, wherein the laser interferometer is mounted on a bracket for the interferometer which put on the ground; the interferometer is located beside one side of the worktable and the reflector is assembled on the worktable.

* * * * *